Patented Feb. 25, 1947

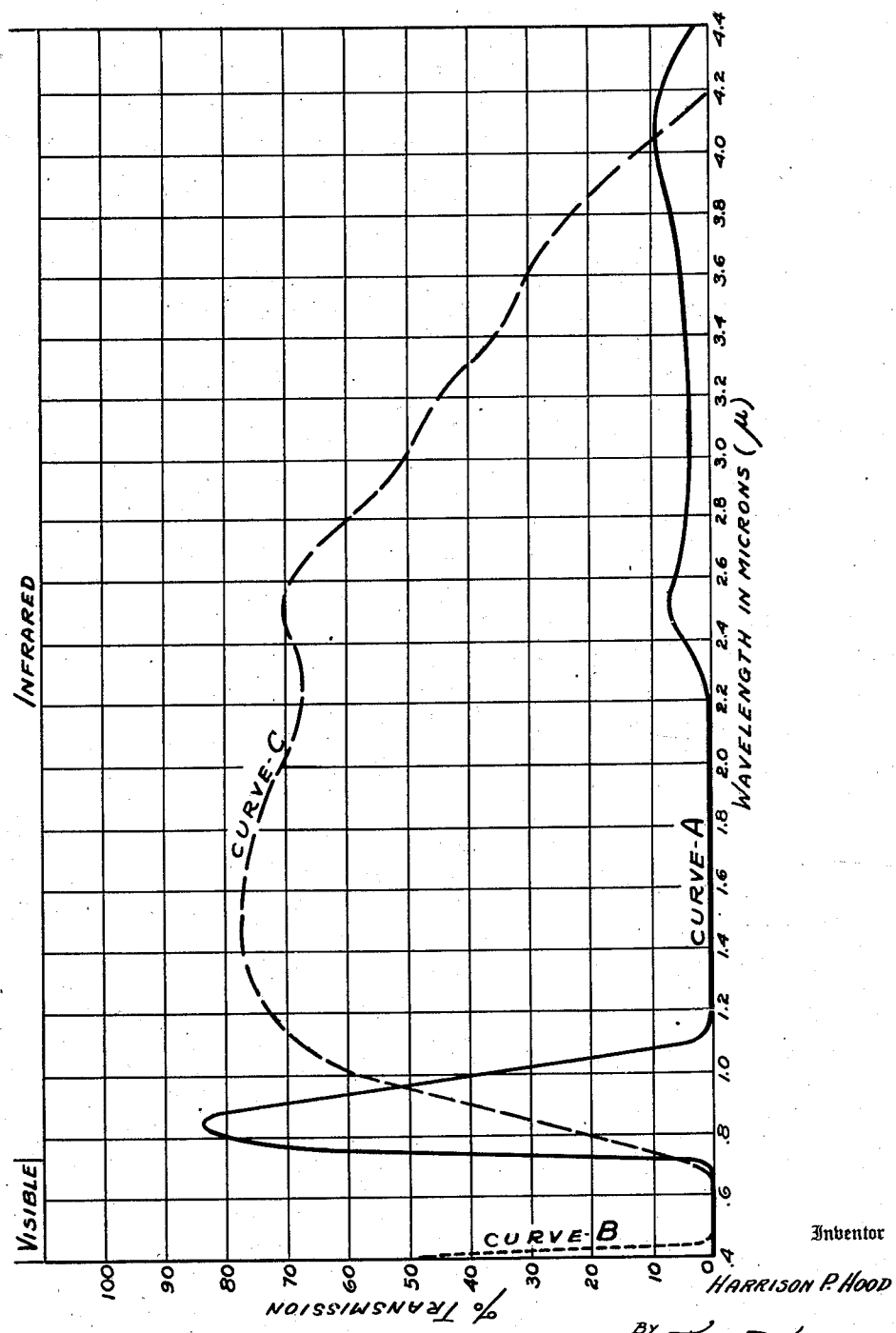

2,416,392

UNITED STATES PATENT OFFICE 2,416,392

INFRARED TRANSMITTING GLASS

Harrison P. Hood, Corning, N. Y., assignor to Corning Glass Works, Corning N. Y., a corporation of New York Application June 17, 1944, Serial No. 540,792

5 Claims. (Cl. 106—52)

This invention relates to glasses which are opaque to visible radiations but substantially transparent to infrared radiations.

The primary object of the invention is to provide a glass which has a specific infrared transmission rendering it particularly suitable for various purposes.

Another object is to provide a glass which is suitable for use as a light filter in conjunction with photoelectric cells which are sensitive to specific infrared radiations.

Another object is to provide a glass which is suitable for use as a filter in infrared therapy.

Another object is to provide a glass which transmits wave lengths between .7 and $1.1\mu$ (micron) but which absorbs the remainder of the infrared and the visible spectrum.

Prior glasses for transmitting the infrared and absorbing the visible spectrum were colored with a substantial amount of manganese, as is shown in Taylor Patent 1,411,133. Such glasses have a relatively high transmission for wave lengths longer than $1\mu$ but considerably less transmission for infrared wave lengths less than $1\mu$.

For some purposes a selective transmission of the shorter infrared wave lengths is desirable. For example, in the therapeutic use of infrared radiations a glass is needed which has a high transmission for the skin-penetrating wave lengths in the region .7 to $1.2\mu$ and complete absorption of the injurious longer wave lengths which cause blistering. Absorption of wave lengths shorter than $.7\mu$ is also desirable although their complete exclusion is not essential for this purpose.

Glasses having the same spectral transmission characteristics are also needed for use in apparatus, such as burglar alarms, signalling devices and the like, embodying a photoelectric cell, such as the so-called caesium cell, which has a maximum infrared sensitivity approximately centered between .8 and $.9\mu$. For this purpose the complete absorption of visible radiations is highly desirable.

I have discovered that the above described spectral transmission characteristics are possessed by colored silicate glasses in which the coloring materials consist of selenium, cadmium sulfide and cobalt oxide. Any silicate glass in which selenium and cadmium sulfide will develop a ruby color may be employed as the base composition of my new glasses. In general, the presence of zinc oxide is essential and any silicate glass which contains at least 2% or more of zinc oxide will develop a ruby color with selenium and cadmium sulfide. Other non-coloring oxides such as alumina, boric oxide, oxides of the other metals of the second periodic group, etc., may be present if they do not prevent the development of color by the selenium. When other second group metal oxides are present, the percentage of zinc oxide should preferably be increased. Glasses which are free from zinc, particularly if melted reducingly, lack the high transmission between .7 and $1.1\mu$, which is characteristic of my new glasses. If desired, low expansion glasses embodying my invention may be produced without depreciation in spectral characteristics by introducing boric oxide into the glass and lowering the alkali content in the manner known for making low expansion glasses.

The coloring materials should preferably be present in the following proportions:

Table I

| | Per cent |
|---|---|
| Se | .7 to 2 |
| CdS | 1 to 3 |
| CoO | 2 to 3 |

Either a cobaltic or a cobaltous compound may be used in the batch, but the latter is preferable because the former has an oxidizing effect. When a higher oxide of a polyvalent metal, say $Co_2O_3$, is present in the batch, some of the cadmium sulfide used as a coloring agent may be oxidized to cadmium oxide and some of the selenium may be lost. Under such conditions the full color of the glass may not develop and its absorption of visible light may be incomplete unless the glass is reheated to "warm in" the desired coloration. The presence of strong oxidizing agents should be avoided, but minor oxidizing effects may be compensated by increasing the proportions of cadmium sulfide and selenium and/or by adding to the batch a small amount of a reducing agent sufficient only to neutralize the objectionable oxidizing effects. I have found that ammonium chloride is particularly suitable because it acts as a very mild reducing agent in such glasses and permits a very accurate control of the optimum degree of reduction.

As examples illustrating my invention, the following compositions are given in weight percentage as calculated from their respective batches:

Table II

|  | 1 | 2 | 3 | 4 | 5 |
|---|---|---|---|---|---|
| $SiO_2$ | 58.0 | 67.3 | 69.7 | 58.0 | 54.2 |
| $K_2O$ | 17.3 |  |  | 8.4 | 8.4 |
| $Na_2O$ |  | 16.8 | 18 | 8.4 | 8.4 |
| ZnO | 7.2 | 9.3 | 4 | 9.3 | 9.3 |
| BaO | 13.2 |  |  |  |  |
| CaO |  |  | 4 |  |  |
| $B_2O_3$ |  |  |  | 9.3 | 9.3 |
| $Al_2O_3$ |  |  |  |  | 3.8 |
| Se | .7 | 1.9 | .7 | 1.9 | 1.9 |
| CdS | 1.0 | 1.9 | 1.0 | 1.9 | 1.9 |
| CoO | 2.6 | 2.8 | 2.6 | 2.8 | 2.8 |

Referring to the drawing, the full line curve A represents the percent transmission in 3 mm. thickness of glass No. 1 of the above table when made with $Co_2O_3$ and subsequently "warmed in." The dotted line curve B represents the small visible transmission which the same glass possesses before "warming in." The dashed line curve C represents the transmission in 2.5 mm. thickness of a prior infrared-transmitting, manganese-containing glass made in accordance with the Taylor Patent 1,411,133. It will be observed that the prior glass, although it completely absorbs the visible, has a substantial transmission throughout the infrared to about $4\mu$. The new glass transmits little, if any, of the infrared outside of the region between .7 and $1.1\mu$, the transmission for the given thickness in this region rising to a maximum of over 80% with a very sharp cut-off.

I claim:

1. An infrared transmitting glass which contains silica, alkali metal oxide, at least 2% of zinc oxide and coloring materials consisting of .7% to 2% selenium, 1% to 3% cadmium sulfide, and 2% to 3% cobalt oxide, as calculated from its batch, and which in a thickness of 2 to 3 mm. has a high transmission for wave lengths from .75 to $1\mu$, but substantially no transmission for the remainder of the infrared nor the visible spectrum.

2. An infrared transmitting glass which contains silaca, alkali metal oxide, at least 2% of zinc oxide and coloring materials consisting of .7-2% Se, 1-3% CdS, and 2-3% CoO, as calculated from its batch, and which in a thickness of 2 to 3 mm. has a high transmission for wave lengths from .75 to $1\mu$, but substantially no transmission for the remainder of the infrared.

3. An infrared transmitting glass which contains approximately 58% $SiO_2$, 17.5% $K_2O$, 7% ZnO, 13% BaO, .7% Se, 1% CdS, and 2.5% CoO, as calculated from its batch.

4. An infrared transmitting glass which contains silica, alkali metal oxide, at least 2% of zinc oxide and coloring materials consisting of Se, CdS and CoO, the glass having a spectral transmission band between wave lengths $.7\mu$ and $1.1\mu$, while substantially completely absorbing wave lengths longer than $1.1\mu$.

5. An infrared transmitting glass which contains silica, alkali metal oxide, at least 2% of zinc oxide and coloring materials consisting of not over 2% Se, not over 3% CdS and not over 3% CoO, the glass having a spectral transmission band between wave lengths $.7\mu$ and $1.1\mu$, while substantially completely absorbing wave lengths longer than $1.1\mu$.

HARRISON P. HOOD.

REFERENCES CITED

The following references are of record in the file of this patent:

UNITED STATES PATENTS

| Number | Name | Date |
|---|---|---|
| 1,864,858 | Rising | June 28, 1932 |
| 1,924,752 | Rising | Aug. 29, 1933 |